US006606651B1

(12) United States Patent
Linde

(10) Patent No.: US 6,606,651 B1
(45) Date of Patent: Aug. 12, 2003

(54) APPARATUS AND METHOD FOR PROVIDING DIRECT LOCAL ACCESS TO FILE LEVEL DATA IN CLIENT DISK IMAGES WITHIN STORAGE AREA NETWORKS

(75) Inventor: David Linde, Plantation, FL (US)

(73) Assignee: Datacore Software Corporation, Ft. Lauderdale, FL (US)

( * ) Notice: Subject to any disclaimer, the term of this patent is extended or adjusted under 35 U.S.C. 154(b) by 0 days.

(21) Appl. No.: 09/565,171

(22) Filed: May 3, 2000

(51) Int. Cl.[7] .............................................. G06F 13/00
(52) U.S. Cl. ...................................... 709/216; 709/203
(58) Field of Search ................................. 709/200, 201, 709/203, 212, 213, 214, 215, 216, 217, 218, 219

(56) References Cited

U.S. PATENT DOCUMENTS

| | | | | |
|---|---|---|---|---|
| 5,367,698 A | * | 11/1994 | Webber et al. | 709/203 |
| 5,930,513 A | * | 7/1999 | Taylor | 717/174 |
| 5,933,603 A | * | 8/1999 | Vahalia et al. | 709/225 |
| 6,256,673 B1 | * | 7/2001 | Gayman | 709/232 |
| 6,393,466 B1 | * | 5/2002 | Hickman et al. | 709/214 |
| 6,457,046 B1 | * | 9/2002 | Munakata | 709/216 |
| 6,523,130 B1 | * | 2/2003 | Hickman et al. | 714/4 |

* cited by examiner

Primary Examiner—Moustafa M. Meky
(74) Attorney, Agent, or Firm—Fenwick & West LLP

(57) ABSTRACT

A volume insight architecture in which software processes internal to the server system issue read/right commands against client data stored on a disk device local to the server independent of client control. A volume insight driver interments the physical location of client data on the server disk and dynamically adjusts the data addresses from the software processes such that they coincide with the actual address of the client data on the server disk. The software processes and the address translation process are invisible to the client. The server treats the locally stored client file system as a local server file system. Processes which can be run against the local file system image on the server cannot distinguish between a true locally mounted file system image and the locally presented file system image presented by the volume insight architecture. Maintenance functions, such as backup, virus detection, etc., are locally performed. This reduces the overhead burden on the client systems.

20 Claims, 4 Drawing Sheets

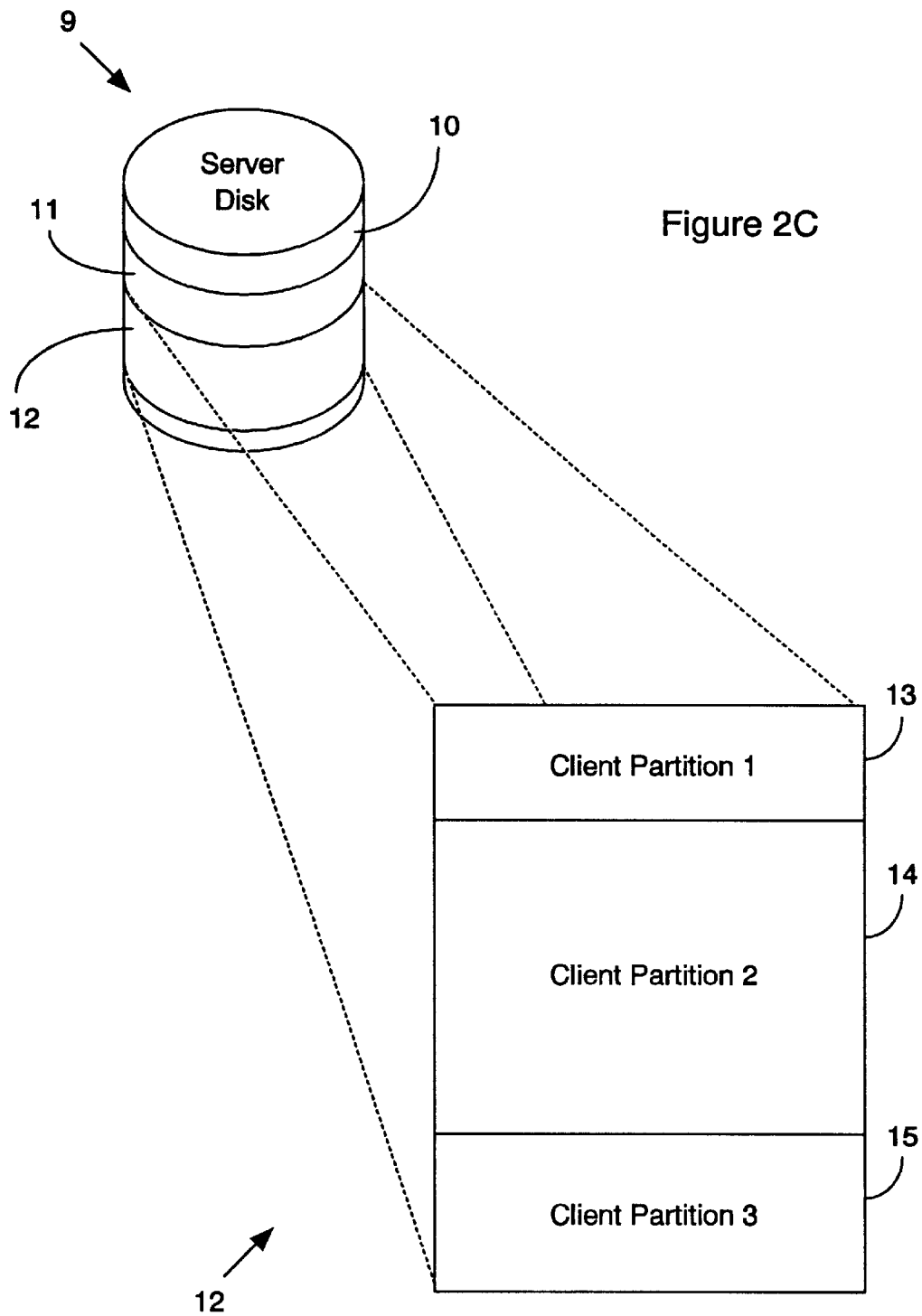

APPARATUS AND METHOD FOR PROVIDING DIRECT LOCAL ACCESS TO FILE LEVEL DATA IN CLIENT DISK IMAGES WITHIN STORAGE AREA NETWORKS

BACKGROUND OF THE INVENTION

1. Technical Field

The present invention relates to computer data storage systems. In particular, it relates to the presentation/access of a client file system image locally to the server which provides the underlying disk image of that client machine or the off loading of routine processes from the client machines onto the server machine which provides the underlying disk image of that client machine.

2. Background Art

The development of computers initially focused on single systems with attached dedicated storage devices. Over time, communication systems were developed to allow sharing of data between computers. Typically, networks of computers use server and client machines. A client machine is used by an individual for specific functions such as billing, etc., while the server system is used to provide the disk storage for one or more client machines. Recent developments involved the sharing of storage devices between systems through the use of SAN and LAN systems, as discussed more fully below. As the use of SAN and LAN systems increased, the number and variety of interconnected device types and systems also increased. The variety of devices available to the users of these systems provide substantial benefits. However, the complexity they also created resulted in substantial performance and compatibility problems. In particular, the software was required to support multiple device types which increased the overhead required by the clients systems. In addition, normal maintenance functions created a burden for each of the local systems which had the effect of reducing overall performance. It would be advantageous to have method of providing a simple interface to numerous, potentially compatible systems. This would provide improved performance, and reduce overall complexity of maintenance and software.

In addition to the performance impact on software operations during normal use, the need for individual systems to perform normal system maintenance operations such as data backup or virus scanning also degrades performance of those systems by increasing their workloads. In addition, these activities also generate additional traffic on SAN/LANs, thereby affecting other systems. It would be desirable to have a method of offloading normal system maintenance functions and eliminating any workload on local systems that it would create.

A problem associated with large multisystem computing environments is that critical data is now found on all platforms spread throughout the enterprise. The drivers required to access data can create problems due to incompatible release levels, etc. It would be desirable to have a system that could provide a single driver interface that reduces complexity as well as reduce the chance of incompatibility.

With the advent of large-scale networking, enterprise applications have proliferated onto a myriad of interconnected computer systems. The combination of networked servers and private storage has guaranteed that data is allocated, replicated, and managed in an ad-hoc manner. Today the limitations of storage technology determine the manner in which data is organized and presented. It would be desirable to be able to manage data on a large-scale, across interconnected computer systems, in such a manner that data availability could be accessed through a single interface and in which maintenance functions can be off loaded and executed independently from the client processor.

Another element of the solution to storage management problems has been the development of storage area network ("SAN") products. A SAN is a connection scheme between computers and storage peripherals which is based on an FC (Fiber Channel) data transport mechanism. SANs typically use FC technology as the data transport means between multiple systems and networks due to their excellent performance and reliability.

A SAN can be defined as an architecture composed of a group of storage systems and servers that are connected together via an FC switch or hub. The introduction of SANs provides some partial solutions to a number of problems related to high bandwidth, and increased connectivity. However while, SANs address improved connectivity and higher bandwidth, they do not resolve problems related to either interface complexity or the distribution of maintenance and backup functions throughout a system rather than centralized control of maintenance and backup functions. The resultant distribution of these fictions and the complexity of the interfaces results in higher levels of data traffic and reduced overall enterprise performance. It would be desirable to have a system in which the users of storage devices on SANs could manage system maintenance independent of the device type, and offload the maintenance and administration functions the user's files on the storage device to the server.

While addressing the basic desirability of providing wide scale access to data, the prior art has failed to provide a uniform and secure method of accessing data on multiple storage device types and failed to provide a method of performing routine maintenance tasks which can be centrally controlled in which eliminates data traffic in the network and overhead to the client systems.

SUMMARY OF THE INVENTION

The present invention solves the foregoing problems by providing a volume insight architecture. Volume insight architecture uses software processes internal to the server system to issue read/right commands against client data stored on a disk device local to the server. A volume insight driver dynamically adjusts the data addresses from the software processes such that they coincide with the actual address of the client data on the server disk. The software processes and the address translation process are invisible to the client. The server treats the locally stored client file system as a local server file system. Processes which can be run against the local file system image on the server cannot distinguish between a true locally mounted file system image and the locally presented file system image presented by the volume insight architecture.

Volume insight architecture also centralizes and supports maintenance functions, such as backup, virus detection, etc. This allows maintenance functions to be performed at the server level which reduces the overhead burden on the client systems using the volume insight architecture.

BRIEF DESCRIPTION OF THE DRAWINGS

FIG. 2C illustrates the relationship between the client disk images and the client partitions shown and FIGS. 2A–B.

DESCRIPTION OF THE PREFERRED EMBODIMENT

Figure 1:
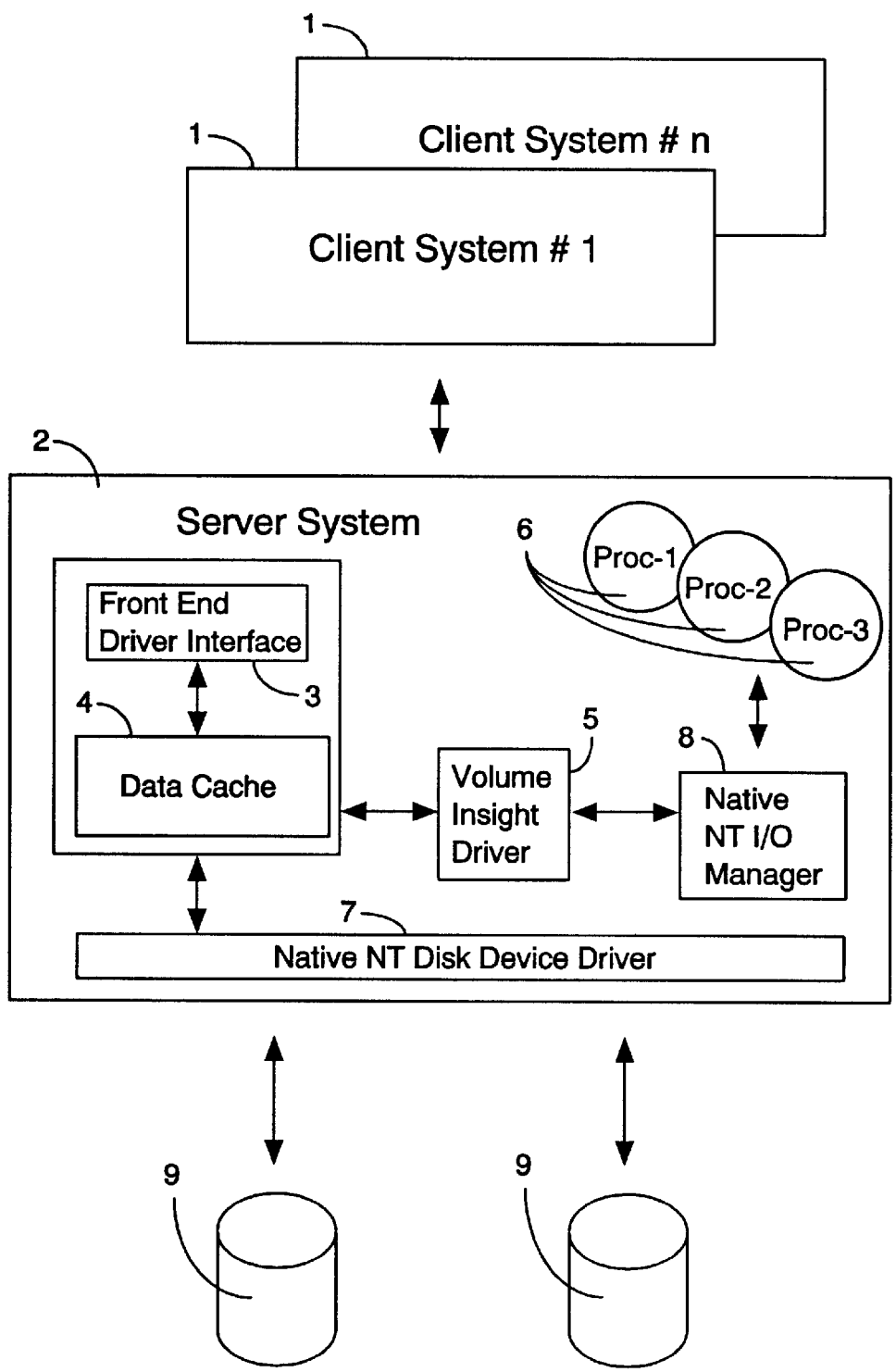
FIG. 1 is a block diagram of the volume insight architecture system which connects client systems to a server storage device.

Prior to a discussion of the figures, a detailed overview of the features and advantages of the invention will be presented. In a typical network environment, a server with typically have large data storage devices which are shared by multiple client systems which are connected to the server. Individual client machines may require only small amounts of storage. For that reason the server system typically allocates small portions of its larger disk drives to the client systems. For ease of discussion, the term "disk" will be used to describe a variety of storage devices which may include magnetic disks, optical disks, holographic memories, solid-state memories, etc.

In a conventional prior art network, a portion of the server disk is allocated to client systems may be broken up into smaller partitions by the client systems. The client systems would be responsible for managing the contents of the portion of the server disk which was allocated to them, and the server typically would not be able to access the individual partitions nor directly manage data on the client allocated portions of the server disk. This is a disadvantage both for the client system and the client. For example, the client system performance is reduced due to the additional overhead burden placed on it when executing routine maintenance and support functions, such as virus scanning, data backup, disk defragmentation, etc. In addition to the burden on the client system, the individual responsible for managing the client system also is burdened with the responsibility of ensuring that these routine maintenance functions are attended to.

The volume insight architecture provides the server with direct access to client data which in turn allows significant performance improvements for client systems because many routine tasks can now be performed on client data by the server without creating any overhead for the client systems. In addition, by automatically attending to these routine maintenance functions, the individual responsible for the client system routine maintenance functions can now use the time formerly dedicated that activity for other more productive functions.

The volume insight architecture uses a volume insight driver to control server access of client data on the server disk. The volume insight driver controls access to the client data in the following manner. First, the volume insight driver determines location of the client disk image within a server partition. Then, the volume insight driver interprets the data on the client disk image to determine the location of the client partitions. For example, in a currently available x86 architecture disk storage system, the server would step through the data in the client disk image until the x86 disk format information is extracted. The disk format information is used to determine the location of client partition boundaries within the client disk image. Once the location of the client partition boundaries is known, the offsets from the beginning of the server disk to the beginning of the client partitions can be calculated to generate the actual location on the server disk where the client data resides. That offset address is used by software processes in the server to access the client data. As a result, the software processes in the server can be used to access client data through the use of the volume insight driver which calculates the correct location of the data on the fly.

An advantage of the volume insight architecture is that it presents a standard disk driver interface locally to the server systems which services basic commands such as Open, Close, Control, Read and Write requests. These basic commands are then translated by the server into commands for an underlying driver that is specifically configured to control a given I/O device type. The overhead of local translation commands on the server has no impact on the client machine. Further, by simplifying operations on the client machine, it improves client machine performance.

Another advantage provided by the volume insight architecture is that it can directly access data in the client partitions allocated to a client by the server, it is then able to off load maintenance functions, such as backup, defragmentation, virus detection, etc. This allows maintenance functions to be performed without degrading performance of the client systems, and further allows these functions to be performed at more convenient times which results in an overall improvement in network performance.

The volume insight architecture can be integrated with storage networks such as SANs and LANs. In a SAN/LAN environment, the effect of the virtual channel is to reduce overall data traffic which results in an overall improvement in system performance. In addition, the virtual channel provides each server system a single driver interface for communication with client systems which allows easy programming and maintenance.

Referring to FIG. 1, this figure Illustrates a computer storage area network architecture in which a variety of client systems 1 are interconnected with server storage devices 9 via a server system 2. The server 2 uses a front end driver interface 3 to present disk images to the client systems 1. Commands and data between the server 2 and the client systems 1 are stored in the data cache 4. The request for data will be translated by the server 2 to the correct command sequence for a native NT device driver 7 which actually communicates with the server storage device 9.

For the purpose of illustration, a Windows/NT (TM) native NT disk device driver 7 is shown. However, those skilled in the art will recognize that any suitable device driver can be used and any suitable operating system can be substituted for the Windows/NT (TM) operating system shown in this figure.

Also shown FIG. 1, is the software device driver component of the invention shown as volume insight (VI) driver 5. The VI driver 5 presents one or more disk partition images to the NT I/O Manager 8. As will be explained more fully below, the VI driver 5 translates the server disk 9 addresses on the fly to provide the proper offset to the client disk image which is in a server partition. The NT I/O manager 8 interrogates the VI driver 5 and will load any necessary file system drivers that are appropriate for each presented partition image. Once NT I/O manager 8 has completed this initial step, processes 6 will have access to the client partition. If a file system was found on the server that was appropriate for the client partition image, then the partition image will appear as a mounted file system locally on the server.

The VI driver 5 of the invention translates the operational request of the NT I/O manager 8 into operational requests of the data cache 4 pertaining to the specific particular server disk partition image 10, 11, 12 which ultimately contained a particular embedded client disk partition 13, 14, 15.

The front end driver interface 3 and data cache 4 store present client disk images 10, 11, 12 within disk partitions on storage attached to the server system 2 (i.e. storage domain controller).

Figure 2A:
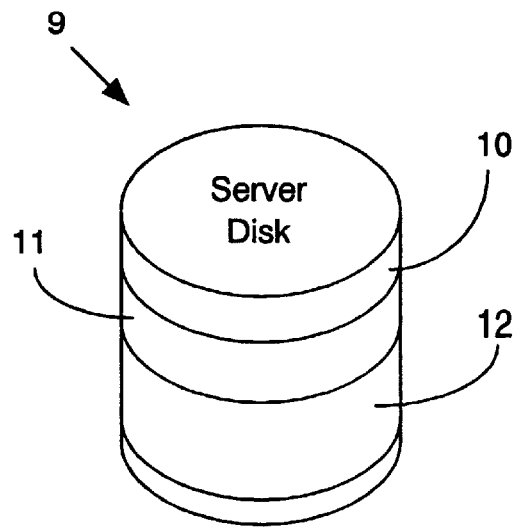
FIG. 2A illustrates possible locations of client disk images arranged on portions of a server storage disk.
Figure 2B:
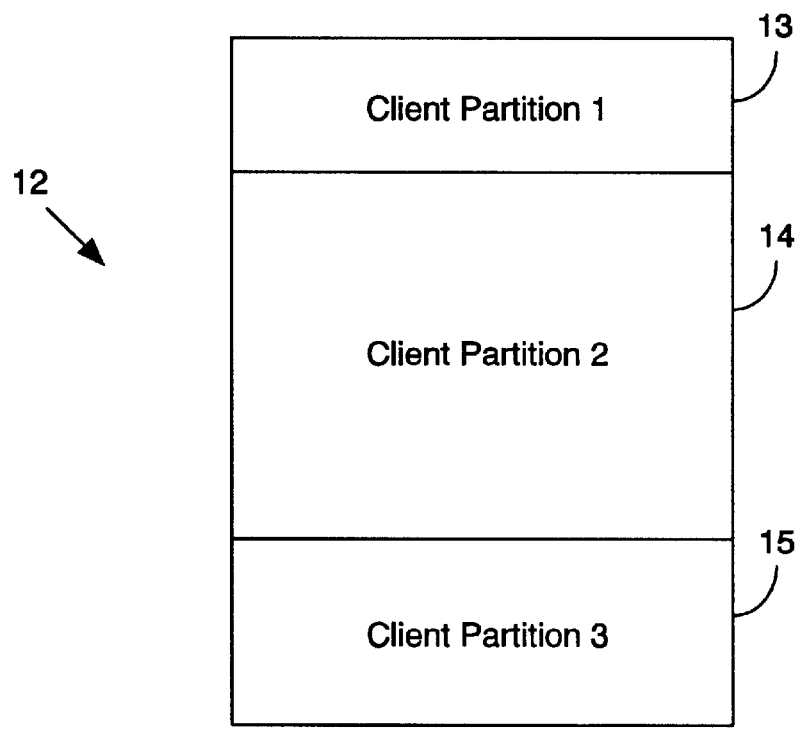
FIG. 2B illustrates the arrangement of client partitions within the server presented client disk image.

Regarding FIGS. 2A–C, the client machine logically partitions the presented disk image into one or more client partitions 13, 14, 15, and then formats these partitions with file system images. The client file system images exist as a finite set of contiguous bits of data embedded somewhere within the disk image presented to the client machine by the storage domain server.

In FIG. 2A, a server storage disk 9 the shown segmented into several portions 10, 11, 12. Each portion 10–12 may be presented as a disk image to a client system 1. When the client system 1 accesses the presented disk image allocated to it, it issues a standard command to the server 2 which receives the command through the front end driver interface 3 which is converted by the server 2 into a command that can be executed by the native NT disk device driver 7 and executed against a server storage device 9. The data accessed by the client system 1 is moved from the client system 1 through the data cache 4 to the server storage device 9 on a write operation, or moved from the server storage device 9 through the data cache 4 to the client system 1 on a read operation.

Given the above described architecture, a benefit provided by the invention is the ability of the server system 2 to directly access and manipulate data within the embedded client system partitions 13, 14, 15. Each client system 1 has a client disk image in the VI driver 5 of server 2 for each of its disks which describes its contents. For example, there would be a client disk image for each storage disk portion 10–12. Of course, as individual client needs increase, a particular client system 1 may have more than one storage disk portions 10–12.

Also shown in the foregoing figures are internal software processes 6 which represent applications that can be run by the server against data on the server disk 9, including the client data. The software processes 6 may include a backup program which automatically starts at a given time of day, defragmentation software, virus detection software which may be started periodically or run prior to saving data, etc. These processes 6 would be executed using the native NT I/O manager 8 on the server system 2. The software processes 6 can be activated and run by the server 2 as follows.

First, the internal software process 6 would be activated and communicate with the native NT I/O Manager 8. The native NT I/O Manager 8 would then access the client disk image data for a particular client on the VI driver 5. Once this client disk image data is obtained, the native NT I/O Manager 8 would use this data to access the server storage device 9 via the native NT disk device driver 7. The VI driver 5 data, having provided the exact location in nature of the contents of a particular storage disk portion 10–12 provides the information necessary for the internal software processes 6 to complete whatever task the internal software process 6 needs to accomplish. As can be seen, this ability to recognize and manipulate client system 1 data by the server 2 can be independent of the client system 1.

FIG. 2B illustrates the segmenting of a particular storage disk portion 12 into three separate partitions. The client disk image contains information related not only to partitions, but also to individual files, filenames, file sizes, etc.

FIG. 2C illustrates the physical relationship between the client partitions 13, 14, 15, and the storage disk portions 10, 11, 12 on the server disk 9.

Figure 3:
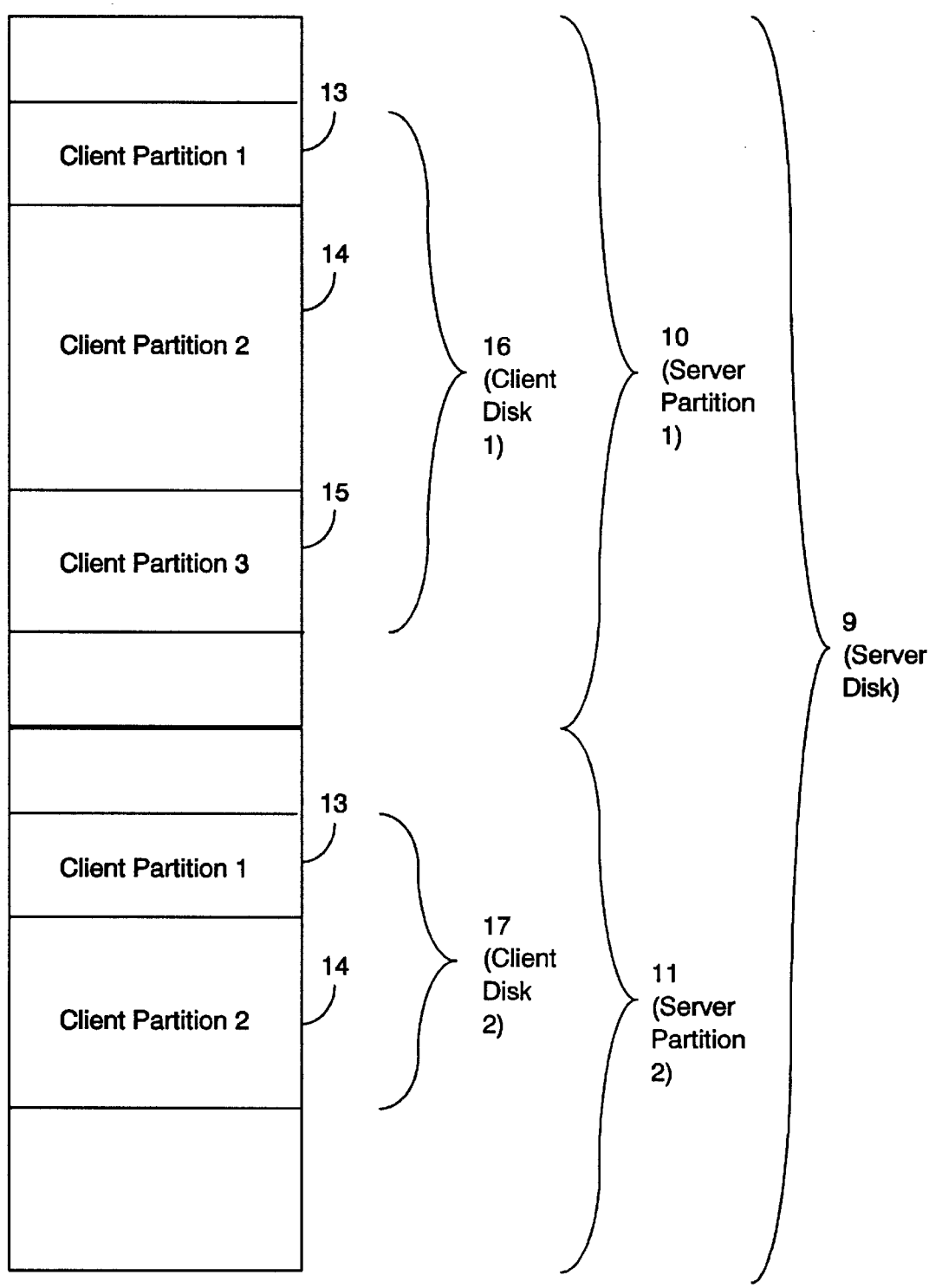
FIG. 3 is a block diagram illustrating allocation of space on the server disk. The illustration shows the allocation of client partitions and client disks on the server disk.

FIG. 3 and illustrates the physical layout of client disk images 16, 17 and client partitions 13, 14, 15 on server partitions 10, 11 on a server disk 9. The client disk image 16, 17 does not have to start at the beginning of the server disk 9, or at the beginning of a server partition 16, 17.

When a software process 6 is initiated, the VI driver 5 obtains the offset to the client partition from the native NT disk device driver 7. Once the offset beginning of the server disk 9 to a particular client disk (for example, client disks 16 or 17) is determined, the VI driver 5 controls access to the data starting at the particular client disk 16 or 17 and begins scanning the data to search for disk format information. Once the disk format information is detected, the partition length information extracted from it. At this point, the VI driver 5 can now calculate the boundaries of the client partitions 13–15. In the case of the first client disk (client disk 16), the boundaries of the three client partitions 13–15 can be calculated at this point by adding the offset information obtained from disk format information from the beginning of the server disk 9. The actual disk location of client partitions 13–15 on the server disk 9 can now be used by the software process 6 to access data on the client disk partition. The VI driver 5 dynamically calculates these offsets when the software process 6 is initiated. As a result, the software process 6 does not have to know the actual location of the data on the client disk, since the VI driver 5 dynamically calculates the offsets the client partitions 13–15 on the fly.

Those skilled in the art will recognize that while the aforedescribed x86 disk architecture uses disks divided into partitions, the same principles can be used with any disk architecture in which data belonging to a user is stored on storage devices on a server, in which may or may not be offset from the beginning of the disk. Important feature of the invention is its ability to dynamically modify client data location addresses so that processes can be run by the server against the client data without having the processes know the actual location of the client data.

While the invention has been described with respect to a preferred embodiment thereof, it will be understood by those skilled in the art that various changes in detail may be made therein without departing from the spirit, scope, and teaching of the invention. For example, any operating system can be substituted for the Windows (TM) system illustrated above, any type of hardware storage device can be used, the number of drivers can vary, etc. Accordingly, the invention herein disclosed is to be limited only as specified in the following claims.

I claim:

1. An apparatus for independent access by a server of client data stored on the server in a computer network, comprising:

a storage device, attached to server, at least portion of the storage device used to store client data;

a server, further comprising:
   means to interpret disk format data on the storage device to determine the location of client data, client disk images, and client partitions stored on the storage device;
   software processes, in the server, the software processes for their having software to alter or manipulate client data independent of client control; and
   a volume insight driver to dynamically convert data addresses from the software processes to coincide with the location of the client data the server storage device;

whereby the software processes in the server alter, manipulate or read client data on the storage device on the server independent of client control.

2. An apparatus, as in claim 1, wherein:

the volume insight driver includes means to determine the location of the client partitions by first determining the offset to the client disk image from a start of the disk, then stepping through the data in the client disk image to determine the lengths of each partition, and then determining the actual location of the partitions;

the volume insight driver having means to receive data address information of the software processes, and further having means to adjust the addresses received from the software processes to match the actual location of client data in the partition.

3. An apparatus, as a claim 2, wherein the software processes automatically access data on client partitions on the server storage device and execute a routine maintenance procedure against the client data.

4. An apparatus, as a claim 3, wherein the software processes automatically scan client data on the server storage device for viruses.

5. An apparatus, as in claim 3, wherein the software processes automatically backup client data on the server storage device.

6. An apparatus, as in claim 3, wherein the software processes automatically defragment the client data on the server storage device.

7. An apparatus, as in claim 3, further comprising:

the volume insight driver determines the location of individual client partitions by scanning data in the client disk to detect the disk format information and by using partition length information in the disk format information to calculate the offset of the boundaries of the client disk image from the beginning of the server disk.

8. An apparatus, as in claim 7, further comprising:

the volume insight driver calculates the actual location of disk data from the offset to the disk data received by a software process and added to the offset of the location of the individual client partition.

9. An apparatus, as in claim 8, wherein the software process accesses client data at the actual location of the disk data by inputting data to the volume insight driver with a non-offset address and then having the non-offset address modified by the volume insight driver to reflect the actual location of the client data.

10. An apparatus, as in claim 9, wherein the volume insight driver dynamically calculates the offset to client data when the software process issues a command to access data with the non-offset address.

11. A method of independently accessing client data stored on the server in a computer network by the software process within the server, including the steps of:

storing client data on a storage device attached to the server;

executing a software process in the server which accesses client data on the storage device;

using a volume insight driver in the server to intercept data address information output by the software process;

interpreting disk format data on the storage device to determine the location of client data, client disk images, and client partitions stored on the storage device;

converting data addresses from the software processes to coincide with the location of the client data the server storage device; and altering, manipulating or reading client data accessed with the inverted data addresses under control of the software processes;

whereby the software processes in the server alter, manipulate or read client data on the storage device on the server independent of client control.

12. A method, as in claim 11, including the additional steps of:

determining the location of the client partitions by first determining the offset to the client disk image from a start of the disk, then searching the data in the client disk image to determine the lengths of each partition, and then determining the actual location of the partitions;

inputting data address information from the software processes to the volume insight driver;

adjusting the addresses received from the software processes to match the actual location of client data in the server disk.

13. A method, as a claim 12, the additional step of automatically accessing data on client partitions on the server storage device and executing a routine maintenance procedure against the client data.

14. A method, as a claim 13, including the additional step of automatically scanning client data on the server storage device, under control of the software process, for viruses.

15. A method, as in claim 13, including the additional step of automatically backing up client data on the server storage device under control the software process.

16. A method, as in claim 13, including the additional step of automatically defragmenting the client data on the server storage device under control of the software process.

17. A method, as in claim 13, including the additional steps of:

using partition length information from the disk format information to calculate the offset of the boundaries of the client disk image from the beginning of the server disk; and determining, under control of the volume insight driver, the location of individual client partitions by scanning data in the client disk to detect the disk format information.

18. A method, as in claim 17, including the additional steps of:

calculating the actual location of disk data from the offset to the disk data received by the software process and adding it to the offset of the location of the individual client partition.

19. A method, as in claim 18, including the additional step of accessing, by the software process, of client data at the actual location of the disk data by inputting data to the volume insight driver with a non-offset address and then modifying the non-offset address by the volume insight driver to reflect the actual location of the client data.

20. A method, as in claim 19, including the additional step of using the volume insight driver to dynamically calculate the offset to client data when the software process issues a command to access data with the non-offset address.

* * * * *